Figures 1, 2, 3:
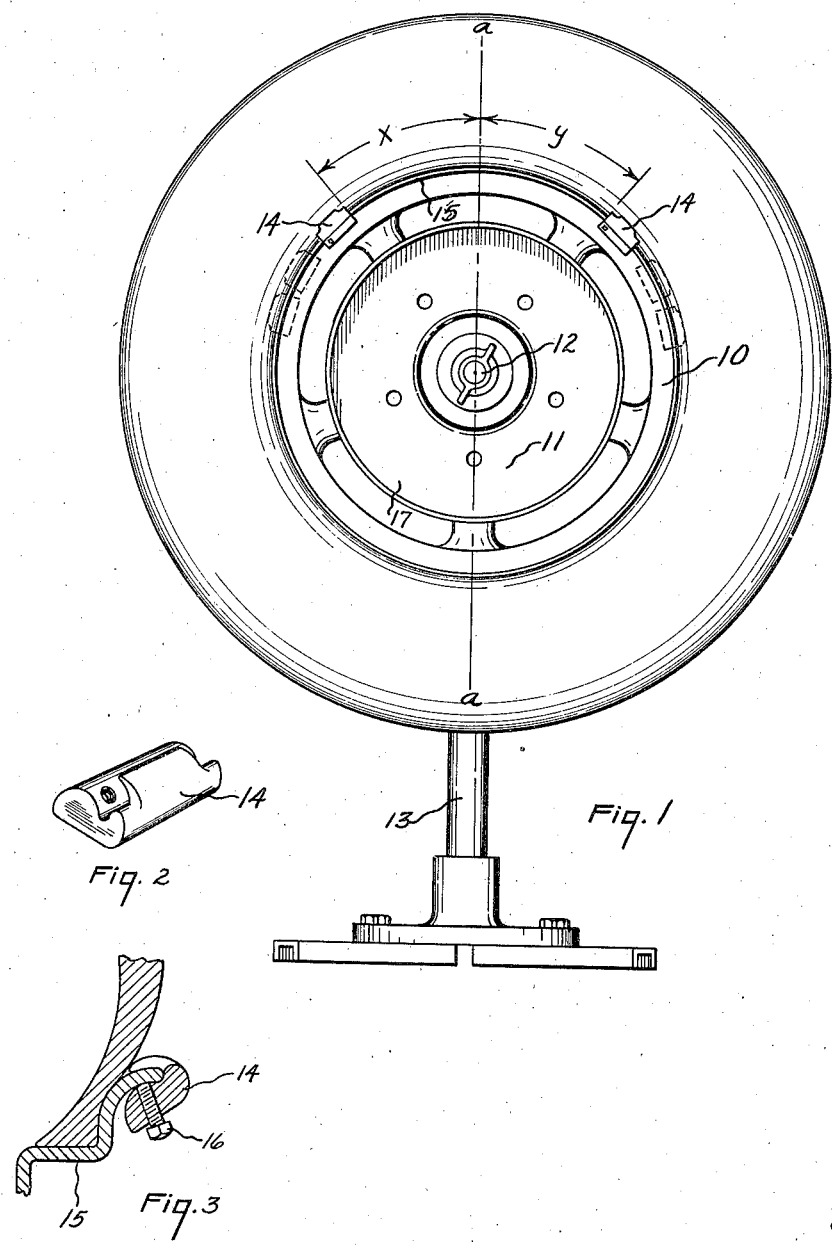

Aug. 25, 1936. J. W. HUME 2,052,295
METHOD OF BALANCING WHEELS
Filed Dec. 27, 1933

Inventor
James W. Hume

Patented Aug. 25, 1936

2,052,295

UNITED STATES PATENT OFFICE 2,052,295

METHOD OF BALANCING WHEELS

James W. Hume, Jackson, Mich.

Application December 27, 1933, Serial No. 704,203

2 Claims. (Cl. 301—5)

The present invention relates to a method of wheel balancing and more particularly to the balancing of the unbalanced weight of an automobile wheel and tire assembly, being a continuation-in-part of my application Serial No. 645,504 filed December 3rd, 1932.

Regardless of preventive means which may be taken in the manufacture of automobile wheels and tires, irregularities invariably occur which result in one portion of the tire or wheel being heavier than the other portions with the result that the wheel will rotate irregularly and if permitted to rotate about a free horizontal axis will come to rest with the heavy portion at the bottom.

According to the present invention the unbalanced weights of the wheel and tire assembly are to be balanced by weights which may be adjustably secured along the edge of the tire retaining flange of the rim. In view of the fact that the unbalanced weights will vary with each wheel and tire assembly and will change during use of the automobile as the result, for example, of stretching, uneven wear of the tire and change of tire and/or tube as to require rebalancing, it is of great importance to avoid the necessity of having to use balancing devices of various weights in order to effect the balancing of the assembly.

Thus it becomes the object of the invention to provide a method of wheel balancing in which a pair of weights of fixed weight and attachable at a fixed radius from the axis of rotation of the wheel may be associated and adjusted to balance weights of varying magnitude.

A further object is to provide a method of wheel balancing in which standard weights may be readily associated and manipulated to balance with precision, wheels with infinite variations in unbalanced weights within the limits of usual manufacturing discrepancies.

These and other objects will more fully appear from the description to follow and the appended claims, taken in connection with the accompanying drawing in which, Fig. 1 is a front elevation of a pneumatic tired vehicle wheel supported upon a balancing stand and being balanced according to my improved method, Fig. 2 is a perspective view of one type of balance weight which is particularly adapted to the invention, and Fig. 3 is a fragmentary cross sectional view through the tire, rim and balance weight showing the relative position of each.

Having specific reference to Fig. 1, by way of example, an entire wheel assembly 10, including the brake drum 11, is shown mounted as a unit upon the spindle 12 of a wheel balancing stand 13 of suitable construction. The wheel 10 is free to rotate upon the spindle 12 and, in the event the center of the weight of the wheel is not at the center of rotation, the wheel will rotate and finally come to rest with the heavy portion at the bottom. For the purpose of illustration the wheel assembly shown in Fig. 1 is assumed to be unbalanced and the wheel has come to rest with the heavy portion at the bottom in a vertical plane $a$—$a$ through the axis of rotation. To balance the wheel assembly, weights 14 shown as attachable to the flange of the rim 15 of the wheel are located at equal distances, represented by the arcs $x$—$y$, from the vertical plane $a$—$a$. These weights in commercial practice will be of standard weight and size; preferably the combined weight of a pair of weights 14 will be sufficient when located directly opposite the heavy portion of the wheel assembly, namely, in vertical plane $a$—$a$ to balance the maximum unbalanced weight of any wheel assembly which is the product of good workmanship. As the unbalanced weights will vary in every case, it may be necessary to locate the weights 14 at various equal distances on opposite sides of the vertical plane $a$—$a$ as indicated by the dotted line representation, in order to shift the center of weight of the wheel to the center of rotation. In view of the fact that the weights 14 may be located in an infinite number of locations along the flange of the rim 15, the wheel assembly can be balanced with precision. During the balancing operation the weights are shifted until the wheel assembly remains at rest in any position to which it is rotated. In practice, the operator will find it convenient to indicate upon the wheel a point diametrically opposite the heavy portion of the assembly as a guide for locating the weights 14. The more the wheel of an assembly is out of balance the closer the weights will be located to the vertical plane $a$—$a$. If the wheel assembly is but slightly out of balance the weights are spread further apart approaching a position where they are substantially diametrically disposed. In extreme cases it may be necessary to employ more than a single pair of weights to balance the assembly.

In Figs. 2 and 3 one convenient form of balance weight is shown which may be readily inserted over the flange of the rim 15 and adjustably secured in position anywhere along the flange by the set screw 16. The particular weight is considered at length in the aforesaid application.

From the foregoing disclosure it should be readily apparent that I have provided a method of balancing wheel assemblies with precision permitting the employment of a standard weight, attachable anywhere along a circular path concentric with the axis of rotation, to balance all wheel assemblies within a wide range. My method of balancing has proven especially adaptable to production assemblies of automotive vehicles as a single standard weight may be employed to balance all the wheel assemblies regardless of the variations in unbalanced weight between different wheels. This method is also advantageous from the standpoint that it makes possible the rebalancing of the wheel assembly without alterations or additions being made to the weights. Furthermore, the wheel may be balanced with the tire inflated. In the embodiment shown in Fig. 1, the brake drum 17 is a part of the assembly and the weights 14 are located upon the inside of the wheel out of view. Although the weights are preferably attached to the rim flange, the provision of a special circular path concentric with the axis of rotation to which the weights may be attached is contemplated. Also the weights might be attached to a part of the brake drum or other circular path concentric with the axis of rotation making up the wheel assembly.

I claim:

1. A method of balancing as a unit the unbalanced weight of an inflated pneumatic tire mounted upon a vehicle wheel having a rim with tire retaining flanges, comprising the selection of removable and adjustable balancing devices of the same weight and of sufficient magnitude to at least counterbalance when associated in pairs the maximum unbalanced weight of the average tire and wheel assembly, supporting said tire and wheel assembly for free rotation about its axis to permit the same to come to rest with the heavy portion of the assembly at the bottom, equally spacing a pair of said devices upon one of said flanges upon opposite sides of a point diametrically opposite said heavy portion, said devices being removably attached and adjustable along the portion of said flange furtherest removed from said axis of rotation, said assembly being balanced as a unit without reference to the unbalanced weight of the wheel or tire, it being possible to rebalance the assembly by adjusting said devices and to locate said devices at any point around the circumference of said flange.

2. A method of balancing as a unit the unbalanced weight of an inflated pneumatic tire mounted upon a vehicle wheel having a rim with tire retaining flanges, comprising the selection of removable and adjustable balancing devices of the same weight and of sufficient magnitude to at least counterbalance when associated in pairs the maximum unbalanced weight of the average tire and wheel assembly, supporting said tire and wheel assembly at its axis of rotation for free movement to determine the heavy portion of the assembly, equally spacing a pair of said devices upon the rim in flange engaging position upon opposite sides of a point diametrically opposite said heavy portion, said devices being removably attached and adjustable along the portion of said flange furthest removed from said axis of rotation, said assembly being balanced as a unit without reference to the unbalanced weight of the wheel or tire, it being possible to rebalance the assembly by adjusting said devices and to locate said devices at any point around the circumference of said flange.

JAMES W. HUME.